(12) United States Patent
Franz et al.

(10) Patent No.: US 7,555,428 B1
(45) Date of Patent: Jun. 30, 2009

(54) SYSTEM AND METHOD FOR IDENTIFYING COMPOUNDS THROUGH ITERATIVE ANALYSIS

(75) Inventors: Alexander Franz, Palo Alto, CA (US); Brian Milch, Berkeley, CA (US)

(73) Assignee: Google Inc., Mountain View, CA (US)

( * ) Notice: Subject to any disclaimer, the term of this patent is extended or adjusted under 35 U.S.C. 154(b) by 574 days.

(21) Appl. No.: 10/647,203

(22) Filed: Aug. 21, 2003

(51) Int. Cl.
*G06F 17/21* (2006.01)
*G06F 17/27* (2006.01)
*G06F 17/28* (2006.01)

(52) U.S. Cl. .................... 704/10; 704/7; 704/9

(58) Field of Classification Search .............. 704/7, 704/10, 9
See application file for complete search history.

(56) References Cited

U.S. PATENT DOCUMENTS

| 5,842,217 | A  | * | 11/1998 | Light ................. 707/101 |
| 5,867,812 | A  | * | 2/1999 | Sassano ............... 704/10 |
| 6,173,298 | B1 | * | 1/2001 | Smadja ............... 715/209 |
| 6,285,999 | B1 |   | 9/2001 | Page |
| 6,349,282 | B1 | * | 2/2002 | Van Aelten et al. ...... 704/257 |
| 6,754,617 | B1 | * | 6/2004 | Ejerhed ................ 704/9 |
| 2007/0067157 | A1 | * | 3/2007 | Kaku et al. ............ 704/10 |

FOREIGN PATENT DOCUMENTS

JP  08-161340  *  6/1996

OTHER PUBLICATIONS

Su. K., Wu, M,. and Chang, J. 1994. A Corpus-based approach to automatic compound extraction. In Proceedings of the 32nd Annual Meeting on Association For Computational Linguistics (Las Cruces, New Mexico, Jun. 27-30, 1994). Annual Meeting of the ACL. Association for Computational Linguistics, Morristown, NJ, 242-247.*

Venkataraman, A. 2001. A statistical model for word discovery in transcribed speech. Comput. Linguist. 27, 3 (Sep. 2001), 352-372.*

Gao, J., Goodman, J., Li, M., and Lee, K. 2002. Toward a unified approach to statistical language modeling for chinese. ACM Transactions on Asian Language Information Processing (TALIP) 1, 1 (Mar. 2002), 3-33. DOI=http://doi.acm.org/10.1145/595576.595578.*

(Continued)

*Primary Examiner*—Paras Shah
(74) *Attorney, Agent, or Firm*—Fish & Richardson P.C.

(57) ABSTRACT

A system and method for identifying compounds through iterative analysis of measure of association is disclosed. A limit on a number of tokens per compound is specified. Compounds within a text corpus are iteratively evaluated. A number of occurrences of one or more n-grams within the text corpus is determined. Each n-gram includes up to a maximum number of tokens, which are each provided in a vocabulary for the text corpus. At least one n-gram including a number of tokens equal to the limit based on the number of occurrences is identified. A measure of association between the tokens in the identified n-gram is determined. Each identified n-gram with a sufficient measure of association is added to the vocabulary as a compound token and the limit is adjusted.

15 Claims, 6 Drawing Sheets

OTHER PUBLICATIONS

Jurafsky, D., et al. (2000). Backoff. Speech and Language Processing.: An Introduction to Natural Language Processing, Computational Linguistics, and Speech Recognition. Pearson Hall Jerse, pp. 216-217.*

Smadja, F. 1993. Retrieving collocations from text: Xtract. Comput. Linguist. 19, 1 (Mar. 1993), 143-177.*

Frantzi, K. T. and Ananiadou, S. 1996. Extracting nested collocations. In Proceedings of the 16th Conference on Computational Linguistics—vol. 1 (Copenhagen, Denmark, Aug. 5-9, 1996). International Conference On Computational Linguistics. Association for Computational Linguistics, Morristown, NJ 41-46. DOI=http://dx.doi.org/10.3115/9926.*

Seretan V., Neriman, L. and Wehrli, E. 2003. Extraction of Multi-Word Collocations Using Syntactic Bigram Composition. In Proceedings of the International Conference on Recent Advances in NLP (RANLP-2003), Borovets, Bulgaria, pp. 131-138.*

C.D. Manning and H. Schutze, "Foundations Of Statistical Natural Languages Processing," Ch. 5, MIT Press (1999).

T. Dunning, "Accurate Methods For The Statistics Of Surprise And Coincidence," *Comp. Ling.*, vol. 19, No. 1, pp. 61-74 (1993).

* cited by examiner

SYSTEM AND METHOD FOR IDENTIFYING COMPOUNDS THROUGH ITERATIVE ANALYSIS

FIELD OF THE INVENTION

The present invention relates in general to text analysis and, in particular, to a system and method for identifying compounds through iterative analysis.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Web provides information via interconnected Web pages that can be navigated through embedded hyperlinks. The Usenet provides information in a non-interactive bulletin board format consisting of static news messages posted and retrievable by readers. In short, the Web and Usenet provide desktop access to a virtually unlimited library of information in almost every language worldwide.

Information exchange on the Web and Usenet both operate under a client-server model. For the Web, individual clients typically execute Web browsers to retrieve and display Web pages in a graphical user environment. For the Usenet, individual clients generally execute news readers to retrieve, post and display news messages, usually in a textual user environment. Both Web browsers and news readers interface to centralized content servers, which function as data dissemination, storage and retrieval repositories.

News messages available via the Usenet are cataloged into specific news groups and finding relevant content involves a straightforward searching of news groups and message lists. Web content, however, is not organized in any structured manner and search engines have evolved to enable users to find and retrieve relevant Web content, as well as news messages and other types of content. As the amount and variety of Web content have increased, the sophistication and accuracy of search engines have likewise improved. Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

Compounds frequently occur in Web content, news messages, and other types of content. A compound, sometimes also referred to as a collocation, is defined as any sequence of words that co-occur more often than by mere chance. Compounds occur in text and speech as a natural language construct and can include proper nouns, such as "San Francisco," compound nouns, such as "hot dog," and other semantic and syntactic language constructs, which result in the co-occurrence of two or more words. Compounds occur with regularity in a range of applications, including speech recognition, text classification, and search result scoring.

Recognizing compounds is difficult, especially when occurring in speech or live text. Moreover, most languages lack regular syntactic or semantic clues to enable easy identification of compounds. In German, for instance, the first letter of each noun is capitalized, which complicates the identification of proper nouns. Similarly, the types of potential compounds can depend on the subject matter. For instance, a scientific paper could include compounds wholly unique from those found in a sports column.

Conventional approaches to finding compounds in a text corpora typically rely on n-gram analysis, such as described in C. D. Manning and H. Schütze, "Foundations of Statistical Natural Languages Processing," Ch. 5, MIT Press (1999), the disclosure which is incorporated by reference. An n-gram is a multi-word occurrence. N-gram-based approaches therefore count the frequencies of individual words or tokens and the frequencies of word sequences of varying lengths. N-gram-based approaches suffer from three principal difficulties.

First, n-gram-based approaches are storage inefficient. As the number of words occurring in each n-gram increases, the number of unique n-grams in a corpus approaches the number of words in a corpus. Storing the counts for long sequences of n-grams can require a prohibitively large amount of memory.

Second, with compounds of varying lengths, the likelihood of spurious shorter compounds being included as substrings increases. Spurious substrings of longer compounds can occur, skewing compound identification results. For example, "New York City" is a three-word compound, where the words "New," "York," and "City" are highly correlated. As a side effect, "York City" is also highly correlated, but generally does not represent a meaningful compound. "York" and "City" are only correlated in the context of the larger compound, "New York City."

Similarly, with compounds consisting of three or more words, the likelihood that a longer compound will contain two-word or three-word compounds as substrings increases. Spurious long compounds that contain shorter, but significant, compounds as substrings can occur. For example, "San Francisco" as a two-word compound, but "San Francisco has" is not a three-word compound. Nevertheless, n-gram-based approaches, which assume all words are independent, would erroneously identify "San Francisco has" as a three-word compound.

Therefore, there is a need for an approach to efficiently identifying compounds in a text corpus based on a measure of association, such as a likelihood of co-occurrence between the words which constitute each compound.

There is a further need for an approach to forming a list of compounds though an analysis of a text corpus with minimal overlapping substrings, minimal overlapping compounds, and efficient memory utilization.

SUMMARY OF THE INVENTION

The present invention provides a system and method for discovering and identifying compounds within a text corpus through iterative analysis of measures of association between constituent tokens. A text corpus is evaluated into a set of unique n-grams and counts of the frequencies of occurrence of each unique n-gram are tallied. Those n-grams having a specified length are selected and the likelihood of each selected n-gram being a compound, that is, the likelihood of collocation, is determined. In the described embodiment, the likelihood of collocation is evaluated using the likelihood ratio method, although other methodologies and approaches could be used, as would be recognized by one skilled in the art. Those n-grams most likely constituting compounds are added to a token vocabulary, preferably up to an upper limit number of n-grams. The token vocabulary is reconstructed to add the new compounds and remove constituent tokens, which occur in the new compounds. The specified length is adjusted and evaluation continues using the revised token vocabulary. In the preceding example, the n-gram "San Francisco has" would receive a relatively low score because a likelihood under the assumption that the n-gram "San Francisco has" is a compound would be only slightly higher than a likelihood under the assumption that "San Francisco" is a compound but the entire n-gram is not a compound.

An embodiment provides a system and method for finding compounds in a text corpus. A vocabulary including tokens extracted from a text corpus is built. Compounds having a plurality of lengths within the text corpus are iteratively identified. Each compound includes a plurality of tokens. A frequency of occurrence for one or more n-grams in the text corpus is evaluated. Each n-gram includes tokens selected from the vocabulary. A likelihood of collocation for one or more of the n-grams having a same length is determined. The n-grams having a highest likelihood are added as compounds to the vocabulary. The vocabulary is rebuilt based on the added compounds.

A further embodiment provides a system and method for identifying compounds through iterative analysis of measure of association. A limit on a number of tokens per compound is specified. Compounds within a text corpus are iteratively evaluated. A number of occurrences of one or more n-grams within the text corpus is determined. Each n-gram includes up to a maximum number of tokens, which are each provided in a vocabulary for the text corpus. At least one n-gram including a number of tokens equal to the limit based on the number of occurrences is identified. A measure of association between the tokens in the identified n-gram is determined. Each identified n-gram with a sufficient measure of association is added to the vocabulary as a compound token. The vocabulary is rebuilt based on the added compound tokens and adjusting the limit. The limit is adjusted.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
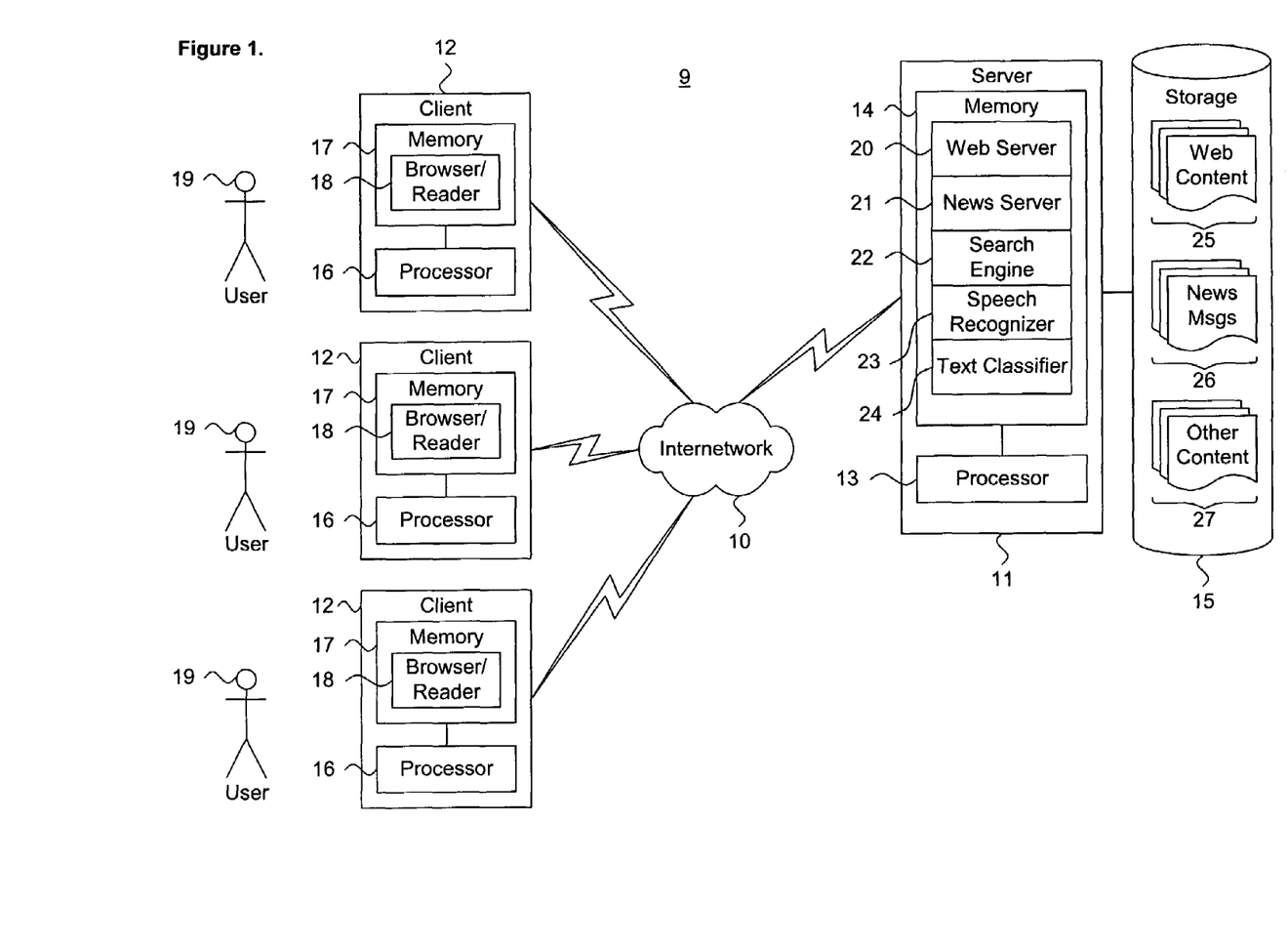
FIG. 1 is a block diagram showing a system for identifying compounds through iterative analysis, in accordance with the present invention.

FIG. 1 is a block diagram showing a system 9 for identifying compounds through iterative analysis, in accordance with the present invention. A plurality of individual clients 12 are communicatively interfaced to a server 11 via an internetwork 10, such as the Internet, or other form of communications network, as would be recognized by one skilled in the art. The individual clients 12 are operated by users 19 who transact requests for Web content, news messages, other types of content, and other operations through their respective client 12.

In general, each client 12 can be any form of computing platform connectable to a network, such as the internetwork 10, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 10 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content retrieval and news message posting and retrieval, each client 12 executes a Web browser and news reader application 18 ("Browser/Reader"). Web content 25 is requested via a Web server 20 executing on the server 11. Similarly, news messages ("News Msgs") 26 are posted and retrieved via a news server 21 also executing on the server 11. In addition, speech, as communicated from a user 19 via a client 12, can be recognized through a speech recognizer 23. Search results and other types of text can be classified by a text classifier 24. Other types of server functionality can be provided, as would be recognized by one skilled in the art. Note the Web browsing, news reading, speech recognition, and text classification functions could be also be implemented separately as stand alone applications, as are known in the art.

The server 11 maintains an attached storage device 15 in which the Web content 25, news messages 26, and other content 27 are stored. The Web content 25, news messages 26, and other content 27 could also be maintained remotely on other Web and news servers (not shown) interconnected either directly or indirectly via the internetwork 10 and which are preferably accessible by each client 12. A compound server (not shown) identifies compounds from a training corpus and creates a list of compounds, as further described below with reference to FIG. 2. The compounds list can be used by the search engine 22, speech recognizer 23, text classifier 24, and other components (not shown) on the server 11, one or more of the clients 12, or on other functional components, as would be recognized by one skilled in the art.

In a further embodiment, a search engine 22 executes on the server 11 for processing queries for Web content 25, news messages 26, and other content 27. Each query describes or identifies information, which is potentially retrievable via either the Web server 20 or news server 21. Preferably, each query provides characteristics, typically expressed as terms, including individual words and compounds. A search engine 22, also executing on the server 11, receives each query, identifies matching Web content 25, news messages 26, and other content 27, and send back results conforming to the query preferences. Other styles, forms or definitions of queries, query characteristics, and related metadata are feasible, as would be recognized by one skilled in the art.

The search engine 22 preferably identifies the Web content 25, news messages 26, and other content 27 best matching the search query terms to provide high quality search results, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 25, news messages 26, and other content 27, the search engine 22 operates on information characteristics describing potentially retrievable content. Note the functionality provided by the server 20, including the Web server 20, news server 21, search engine 22, speech recognizer 23, and text classifier 24 could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15 and 28, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Compound Server

Figure 2:
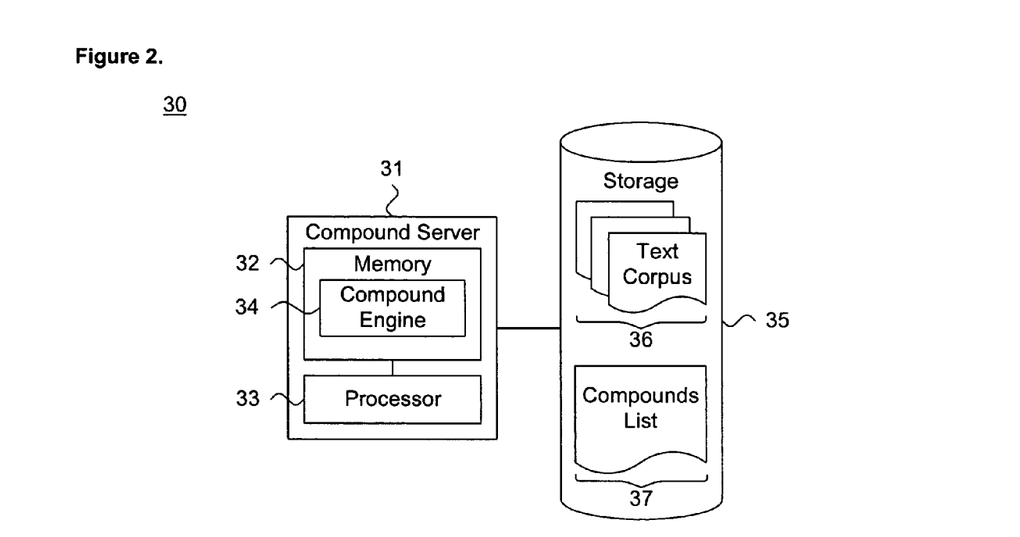
FIG. 2 is a functional block diagram showing a compound server, in accordance with the present invention.

FIG. 2 is a functional block diagram 30 showing a compound server 31, in accordance with the present invention. The compound server 31 discovers and identifies compounds based on tokens extracted from a text corpus 36 and stores the compounds in a compounds list 37. The compounds server 31 includes a compound engine 34, which identifies compounds through iterative analysis, as further described below with reference to FIG. 3.

The compound server 31 maintains an attached storage device 35 in which the text corpus 36 and compounds list 37 are stored. The text corpus 36 consists of documents that include Web content, news messages, and other content, including the Web content 25, news messages 26, and other content 27 stored by the server 11 (shown in FIG. 1), as well as documents from other sources, as is known in the art.

The individual computer system, including the compound server 31, include general purpose, programmed digital computing devices consisting of a central processing unit (processor 33), random access memory (memory 32), non-volatile secondary storage 35, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Compound Server Components

Figure 3:
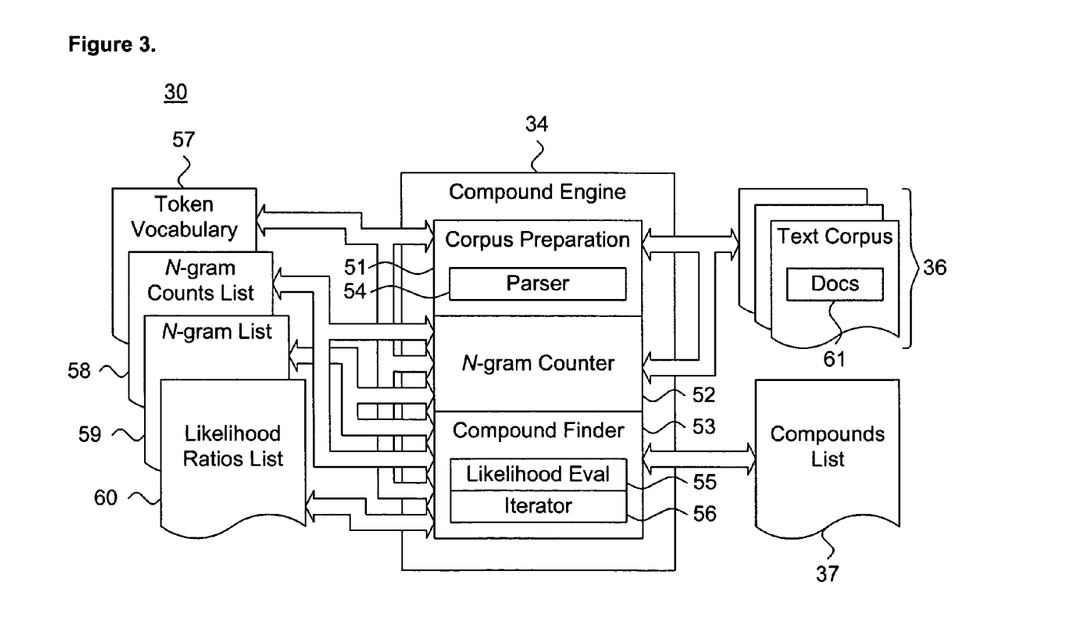
FIG. 3 is a functional block diagram showing the software modules used by the compound engine of FIG. 2.

FIG. 3 is a functional block diagram 50 showing the software modules used by the compound engine 34 of FIG. 2. The compound engine 34 consists of a corpus preparation component 51, n-gram counter 52, and compound finder 53.

The corpus preparation component 51 and n-gram counter 52 both operate on the text corpus 36, which consists of a set of documents ("Docs") 61 that contain raw text provided as Web content, news messages, and other content. The corpus preparation component 51 evaluates the text corpus 36 to construct an initial token vocabulary 57, as further described below with reference to FIG. 5. The corpus preparation component 51 includes a parser 54 that tokenizes each document 61 in the text corpus 36. Tokenizing removes white space, punctuations, and formatting artifacts to form a clean list of individual words, which each becomes a one-word token.

The n-gram counter 52 is used by the compound finder 53 to determine the frequencies of occurrences of unique n-grams within the text corpus 36, as further described below with reference to FIG. 7. The n-gram counter 52 generates a list of the counts of occurrences of each n-gram 58 and a list of unique n-grams 59.

The compound finder 53 uses the n-gram counts list 58 to determine, for each n-gram of a desired length, the likelihood that the n-gram is a compound, as further described below with reference to FIG. 6. The compound finder 53 retrieves each unique n-gram from the unique n-gram list 59. A likelihood ratio component 55 determines the likelihood of an n-gram being a compound and stores the computed likelihood ratio in a likelihood ratio list 60. The compound finder 53 identifies those unique n-grams having a highest likelihood of being compounds and generates a compounds list 37. An iterator 56 repetitively executes the operations of the n-gram counter 52 and compound finder 53 to progressively identify compounds of varying lengths in the text corpus 36.

Method Overview

Figure 4:
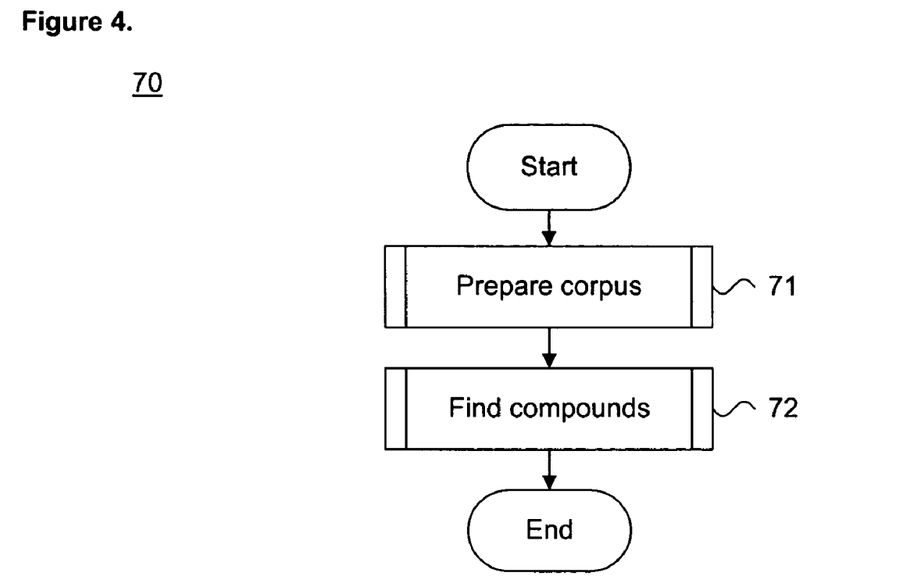
FIG. 4 is a flow diagram showing a method for identifying compounds through iterative analysis, in accordance with the present invention.

FIG. 4 is a flow diagram showing a method 70 for identifying compounds through iterative analysis, in accordance with the present invention. The method 70 is described as a sequence of process operations or steps, which can be executed, for instance, by the compound engine 34 of FIG. 2, or equivalent components.

The method 70 performs two functions: preparing the text corpus 36 and generating the list of compounds 37. Accordingly, the text corpus 36 is prepared (block 71), as further described below with reference to FIG. 5. Next, compounds are found (block 72), as further described below with reference to FIG. 6. Routine then terminates.

Preparing Corpus

Figure 5:
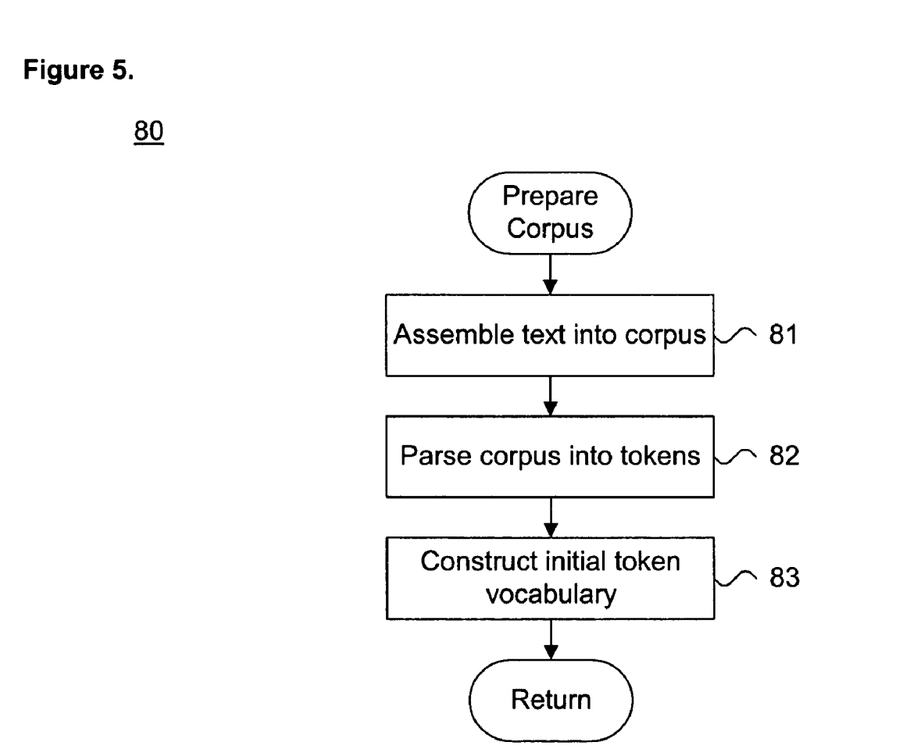
FIG. 5 is a flow diagram showing the routine for preparing a corpus for use in the method of FIG. 4.

FIG. 5 is a flow diagram showing the routine 80 for preparing a corpus for use in the method 70 of FIG. 4. The purpose of this routine is to convert the documents 61 in the text corpus 36 into a raw set of individual words, which are stored as one-word tokens in a token vocabulary 57 (shown in FIG. 3).

The routine begins by assembling the text in the individual documents 61 into the text corpus 36 (block 81). If required, the text corpus 36 is parsed into individual tokens (block 82) by removing white space, punctuations, and formatting artifacts, such as HTML tags and related extraneous data, as is known in the art. Finally, an initial token vocabulary 57 is constructed from words extracted from the text corpus 36 (block 83). The routine then returns.

Finding Compounds

Figure 6:
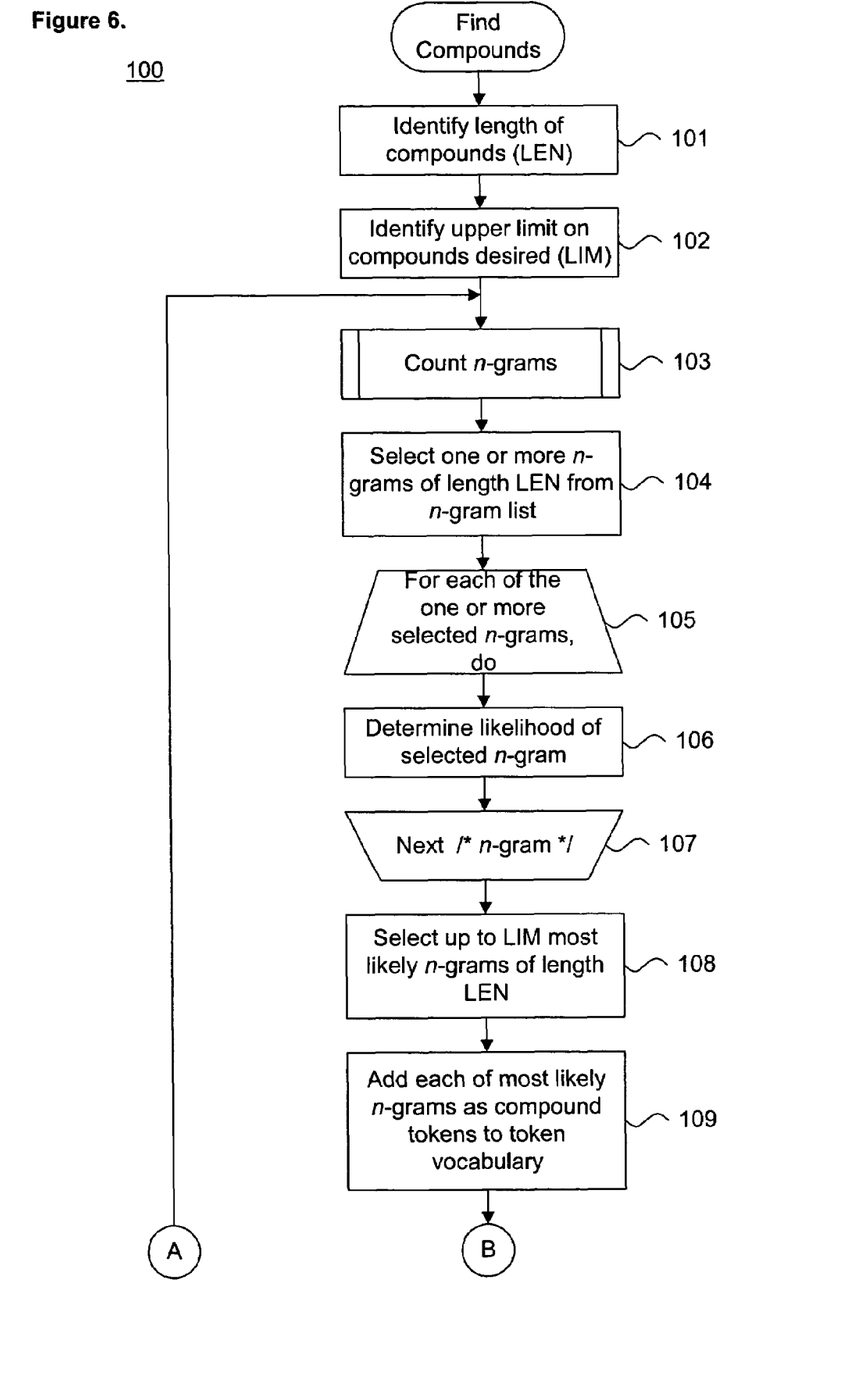
FIG. 6 is a flow diagram showing the routine for finding compounds for use in the method of FIG. 4.

FIG. 6 is a flow diagram showing the routine 100 for finding compounds for use in the method 70 of FIG. 4. The purpose of this routine is to discover and identify compounds within the text corpus 36 based on evaluation of measures of association for each potential compound.

The routine analyzes the text corpus 36 in an iterative manner. During each iteration (blocks 103-111), a set of n-grams of a specified length having the highest likelihood of co-occurrence, that is, of being compounds, are identified. In subsequent iterations (block 111), the length of the compounds is adjusted to identify further compounds. The use of measures of association, such as likelihood hypotheses, allows spurious substrings and multiple-token compounds to be avoided, as well as to efficiently store only those n-grams with stronger likelihoods of co-occurrence.

The routine begins by initially identifying an initial length for compounds and, in one embodiment, an upper limit on the number of compounds desired (blocks 101 and 102, respectively). The length of the compounds changes during subsequent iterations (block 111). The upper limit functions as a quality filter that limits the potential compounds to a fixed number of candidates preferably having the highest likelihood of being compounds. Next, the n-grams occurring in the text corpus 36 are identified and counted (block 103), as further described below with reference to FIG. 7. The counting of n-grams generates the list of n-gram counts 58 and the list of unique n-grams 59. One or more of the n-grams of the specified length of compounds are selected from the list of unique n-grams 59 (block 104). Note that the entire set of n-grams of the specified length need not be selected. For example, n-grams appearing in a list of known compounds, such as city names, could be skipped for efficiency. For each of the one or more selected n-grams (block 105) for which a compound determination is desired, the likelihood of the selected n-gram being a compound is determined (block 106). Likelihood determination may then continue with each of the remaining selected n-grams (block 107).

In the described embodiment, the likelihood of a selected n-gram being a compound is determined using a measure of association, known as the likelihood ratio method, as described in T. Dunning, "Accurate Methods for the Statistics of Surprise and Coincidence," *Comp. Ling.*, Vol. 19, No. 1, pp. 61-74 (1993), the disclosure of which is incorporated by reference.

Each selected n-gram is assigned a score equal to the likelihood of the observed text corpus under the assumption that the n-gram is a compound, divided by the likelihood of the observed text corpus under the assumption that the n-gram is not a compound, as expressed as equation (1):

$$\lambda = \frac{L(H_i)}{L(H_c)} \qquad (1)$$

where $L(H_i)$ is the likelihood of observing the data $H_i$ under an independence hypothesis and $L(H_c)$ is the likelihood of observing the data $H_c$ under a collocation hypothesis. Assuming a binomial distribution applies, the independence hypothesis can be expressed as equation (2):

$$P(t_2|t_1) = P(t_2|\overline{t_1}) \qquad (2)$$

where $t_1$ and $t_2$ are a pair of tokens in the selected n-gram. Similarly, the collocation hypothesis can be expressed as equation (3):

$$P(t_2|t_1) > P(t_2|\overline{t_1}) \qquad (3)$$

where $t_1$ and $t_2$ are a pair of tokens in the selected n-gram.

Under the collocation hypothesis, for each sequence $S = w_1, \ldots, w_n$ of n tokens in the text corpus 36, $\lambda(S)$ will be the greatest likelihood ratio found by considering all possible ways to split the n-token sequence into two contiguous parts. The n-token sequences S are sorted by $\lambda(S)$ and designated the $K_n$ sequences with the lowest $\lambda(S)$ values as collocations. The collocation hypothesis $L(H_c)$ can be computed, as expressed as equation (4):

$$\operatorname*{argmax}_{L(H_i)} \frac{L(t_1, t_2 \text{ form compound})}{L(n - \text{gram does not form compound})} \qquad (4)$$

Finally, the score $\lambda$ is calculated by solving for $L(H_i)$ and $L(H_c)$. Other equations, methods and processes for determining measures of association are visible, as would be recognized by one skilled in the art.

Next, up to the upper limit most likely n-grams of the specified length are selected (block 108) and added as compound tokens to the token vocabulary 57 (block 109). The token vocabulary 57 is reconstructed (block 110) using the newly-added tokens in the token vocabulary 57. During reconstruction, constituent tokens, which occur in each newly-added token are removed from the token vocabulary 57 and the newly-added tokens are subsequently treated as one unit in the text corpus 36. For example, each occurrence of the words "San" and "Francisco" will subsequently be treated as a single compound token "San Francisco." If further iterations are required (block 111), the length of the compounds is adjusted (block 112). In the described embodiment, long compounds are identified during the first iteration and progressively shorter compounds are identified in subsequent iterations. Each subsequent iteration begins with the identification and recounting of the n-grams occurring in the text corpus 36 (block 103). The n-grams must be recounted to account for those compound tokens newly-added and constituent tokens newly-removed from the token vocabulary 57 during the previous iteration. Upon completion of the iterations, the routine returns.

Counting N-Grams

Figure 7:
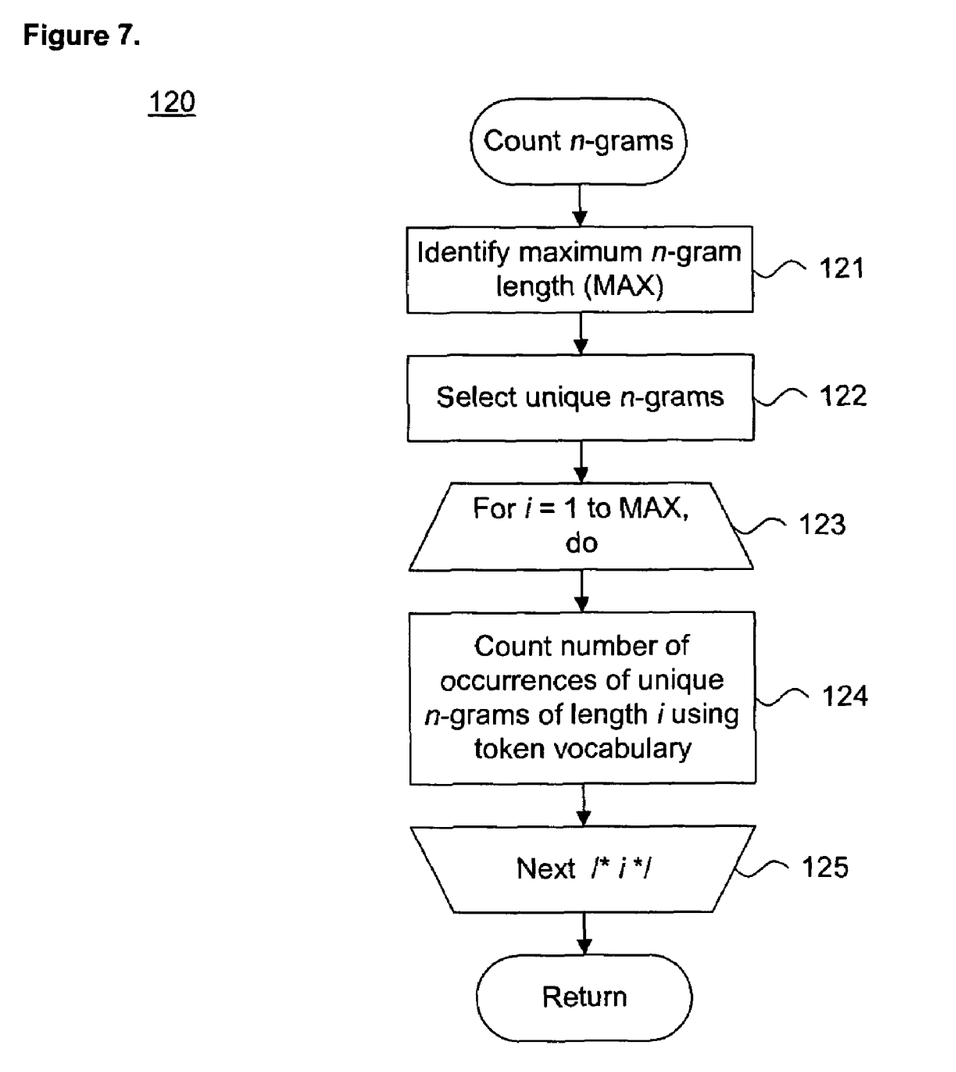
FIG. 7 is a flow diagram showing the routine for counting n-grams for use in the routine of FIG. 6.

FIG. 7 is a flow diagram showing the routine 120 for counting n-grams for use in the routine 100 of FIG. 6. The purpose of this routine is to generate the list of unique n-grams 59 and list of n-gram counts 58.

The maximum n-gram length is identified (block 121). The maximum n-gram length will equal the current compounds length used in the routine to find compounds 100. Next, the unique n-grams having a number of tokens equal to the maximum n-gram length are selected (block 122). For each n-gram having a length of up to the maximum n-gram length (block 123), the number of occurrences of each unique n-gram of that length is counted against the token vocabulary 57 (block 124). Counting continues for each subsequent n-gram length (block 125), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for identifying compounds in text, comprising: extracting a vocabulary of tokens from text; iterating from n>2 down to n=2 where n decreases by one each iteration and in each iteration performing the actions of: identifying a plurality of unique n-grams in the text, each n-gram being an occurrence in the text of n sequential tokens, each token being found in the vocabulary; dividing each n-gram into n−1 pairs of two adjacent segments, where each segment consists of at least one token; for each n-gram, calculating a likelihood of collocation for each pair of the n−1 pairs of two adjacent segments of the n-gram and determining a score for the n-gram based on a lowest calculated likelihood of collocation for the each of the n−1 pairs; identifying a set of n-grams having scores above a threshold; and adding the identified set of n-grams as compound tokens to the vocabulary and removing constituent tokens that occur in the added compound tokens from the vocabulary, wherein the iterating is performed by one or more processors.

2. The method of claim 1 where calculating a likelihood of collocation for each pair of segments of the n-gram comprises determining a likelihood ratio $\lambda$ for each pair of segments that is computed in accordance with the formula:

$$\lambda = \frac{L(H_i)}{L(H_c)}$$

where $L(H_i)$ is a likelihood of observing $H_i$ under an independence hypothesis, $L(H_c)$ is a likelihood of observing $H_c$ under a collocation hypothesis, and H is a pair of segments.

3. The method of claim 2 where the $L(H_c)$ is computed for each pair of segments, $t_1$, $t_2$, in each n-gram in accordance with the formula:

$$\underset{L(H_i)}{\mathrm{argmax}} \frac{L(t_1, t_2 \text{ form compound})}{l(n - \text{gram does not form compound})}.$$

4. The method of claim 2 where, for each pair of segments, $t_1$, $t_2$, in each n-gram, the independence hypothesis comprises $P(t_2|t_1)=P(t_2|\overline{t_1})$ and the collocation hypothesis comprises $P(t_2|t_1)>P(t_2|\overline{t_1})$.

5. The method of claim 1 where identifying a plurality of unique n-grams in the text comprises skipping n-grams appearing in a list of known compounds.

6. A computer readable storage medium on which program code is stored, which program code, when executed by a processor, causes the processor to perform operations comprising: extracting a vocabulary of tokens from text; iterating from n>2 down to n=2 where n decreases by one each iteration and in each iteration performing the actions of: identifying a plurality of unique n-grams in the text, each n-gram being an occurrence in the text of n sequential tokens, each token being found in the vocabulary; dividing each n-gram into n−1 pairs of two adjacent segments, where each segment consists of at least one token; for each n-gram, calculating a likelihood of collocation for each of the n−1 pairs of two adjacent segments of the n-gram and determining a score for the n-gram based on a lowest calculated likelihood of collocation for the each of the n−1 pairs; identifying a set of n-grams having scores above a threshold; and adding the identified set of n-grams as compound tokens to the vocabulary and removing constituent tokens that occur in the added compound tokens from the vocabulary.

7. The computer-readable storage medium of claim 6 where calculating a likelihood of collocation for each pair of segments of the n-gram comprises determining a likelihood ratio $\lambda$ for each pair of segments that is computed in accordance with the formula:

$$\lambda = \frac{L(H_i)}{L(H_c)}$$

where $L(H_i)$ is a likelihood of observing $H_i$ under an independence hypothesis, $L(H_c)$ is a likelihood of observing $H_c$ under a collocation hypothesis, and H is a pair of segments.

8. The computer-readable storage medium of claim 7 where the $L(H_c)$ is computed for each pair of segments, $t_1$, $t_2$, in each n-gram in accordance with the formula:

$$\underset{L(H_i)}{\mathrm{argmax}} \frac{L(t_1, t_2 \text{ form compound})}{l(n - \text{gram does not form compound})}.$$

9. The computer-readable storage medium of claim 7 where, for each pair of segments, $t_1$, $t_2$, in each n-gram, the independence hypothesis comprises $P(t_2|t_1)=P(t_2|\overline{t_1})$ and the collocation hypothesis comprises $P(t_2|t_1)>P(t_2|\overline{t_1})$.

10. The computer-readable storage medium of claim 6 where identifying a plurality of unique n-grams in the text comprises skipping n-grams appearing in a list of known compounds.

11. A system comprising: a computer readable storage medium on which a program product is stored; and one or more processors configured to execute the program product and perform operations comprising: extracting a vocabulary of tokens from text; iterating from n>2 down to n=2 where n decreases by one each iteration and in each iteration performing the actions of: identifying a plurality of unique n-grams in the text, each n-gram being an occurrence in the text of n sequential tokens, each token being found in the vocabulary; dividing each n-gram into n−1 pairs of two adjacent segments, where each segment consists of at least one token; for each n-gram, calculating a likelihood of collocation for each of the n−1 pairs of two adjacent segments of the n-gram and determining a score for the n-gram based on a lowest calculated likelihood of collocation for the each of the n−1 pairs; identifying a set of n-grams having scores above a threshold; and adding the identified set of n-grams as compound tokens to the vocabulary and removing constituent tokens that occur in the added compound tokens from the vocabulary.

12. The system of claim 11 where calculating a likelihood of collocation for each pair of segments of the n-gram comprises determining a likelihood ratio $\lambda$ for each pair of segments that is computed in accordance with the formula:

$$\lambda = \frac{L(H_i)}{L(H_c)}$$

where $L(H_i)$ is a likelihood of observing $H_i$ under an independence hypothesis, $L(H_c)$ is a likelihood of observing $H_c$ under a collocation hypothesis, and H is a pair of segments.

13. The system of claim 12 where the $L(H_c)$ is computed for each pair of segments, $t_1$, $t_2$, in each n-gram in accordance with the formula:

$$\underset{L(H_i)}{\mathrm{argmax}} \frac{L(t_1, t_2 \text{ form compound})}{l(n - \text{gram does not form compound})}.$$

14. The system of claim 12 where, for each pair of segments, $t_1$, $t_2$, in each n-gram, the independence hypothesis comprises $P(t_2|t_1)=P(t_2|\overline{t_1})$ and the collocation hypothesis comprises $P(t_2|t_1)>P(t_2|\overline{t_1})$.

15. The system of claim 11 where identifying a plurality of unique n-grams in the text comprises skipping n-grams appearing in a list of known compounds.

* * * * *

UNITED STATES PATENT AND TRADEMARK OFFICE
CERTIFICATE OF CORRECTION

PATENT NO. : 7,555,428 B1
APPLICATION NO. : 10/647203
DATED : June 30, 2009
INVENTOR(S) : Alexander Mark Franz and Brian Milch It is certified that error appears in the above-identified patent and that said Letters Patent is hereby corrected as shown below:

Column 9, Lines 32-34 at Claim 3; replace the current formula with:

$$\arg\max_{L(H_i)} \frac{L(t_1, t_2 \text{ form compound})}{L(n - \text{gram does not form compound})}$$

Column 10, Lines 14-17 at Claim 8; replace the current formula with:

$$\arg\max_{L(H_i)} \frac{L(t_1, t_2 \text{ form compound})}{L(n - \text{gram does not form compound})}$$

Column 10, Line 21 at Claim 9; replace the current formula with:

$$P(t_2 \mid t_1) = P(t_2 \mid \overline{t_1})$$

Column 10, Lines 63-66 at Claim 13; replace the current formula with:

$$\arg\max_{L(H_i)} \frac{L(t_1, t_2 \text{ form compound})}{L(n - \text{gram does not form compound})}$$

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,555,428 B1 | Page 1 of 1 |
| APPLICATION NO. | : 10/647203 | |
| DATED | : June 30, 2009 | |
| INVENTOR(S) | : Franz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this
Twenty-eighth Day of December, 2010

David J. Kappos
*Director of the United States Patent and Trademark Office*